(12) United States Patent
Price et al.

(10) Patent No.: US 6,778,664 B1
(45) Date of Patent: Aug. 17, 2004

(54) LINE CURRENT PROTECTION CIRCUIT AND METHOD FOR LINEAR AND NONLINEAR HOLD CIRCUIT

(75) Inventors: Tim Urry Price, Salt Lake City, UT (US); Scott W. Rupp, Grantsville, UT (US); Randy Rollins, West Jordan, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/525,201

(22) Filed: Mar. 14, 2000

(51) Int. Cl.[7] .............................. H04M 1/00; H02H 1/00
(52) U.S. Cl. ...................... 379/412; 379/377; 379/393; 379/399.01; 361/119
(58) Field of Search ................................ 379/412, 399, 379/407, 393, 387, 462, 9.06, 27.01, 27.05, 399.01, 387.01; 361/119, 18, 21

(56) References Cited

U.S. PATENT DOCUMENTS

| | | | |
|---|---|---|---|
| 3,903,375 A | 9/1975 | DeWit | 379/378 |
| 4,317,964 A | 3/1982 | Biggs et al. | 379/379 |
| 4,603,234 A | 7/1986 | Huet et al. | 379/379 |
| 4,709,296 A | 11/1987 | Hung et al. | 361/102 |
| 4,723,267 A | 2/1988 | Jones et al. | 379/93.05 |
| 4,958,371 A | 9/1990 | Damoci et al. | 379/377 |
| 5,042,065 A | 8/1991 | Kim | 379/165 |
| 5,125,027 A | 6/1992 | Blaszykowski et al. | 379/399 |
| 5,140,631 A | 8/1992 | Stahl | 379/377 |
| 5,369,687 A | 11/1994 | Farkas | 379/93.36 |
| 5,390,231 A * | 2/1995 | Hung et al. | 379/412 |
| 5,488,572 A | 1/1996 | Belmont | 710/62 |
| 5,532,898 A * | 7/1996 | Price | 361/119 |
| 5,606,704 A | 2/1997 | Pierce et al. | 713/322 |
| 5,696,660 A | 12/1997 | Price | 361/119 |
| 5,777,836 A | 7/1998 | Price et al. | 361/94 |
| 5,783,999 A | 7/1998 | Price et al. | 340/664 |
| 5,790,656 A * | 8/1998 | Rahamim et al. | 379/399 |
| 5,809,068 A * | 9/1998 | Johnson | 375/222 |
| 5,809,109 A * | 9/1998 | Moyal et al. | 379/412 |
| 5,912,513 A | 6/1999 | Hollenbach et al. | 307/44 |
| 6,088,446 A | 7/2000 | Huang | 379/412 |
| 6,188,764 B1 | 2/2001 | Huang et al. | 379/412 |
| 6,201,865 B1 * | 3/2001 | Dupuis et al. | 379/393 |
| 6,282,271 B1 * | 8/2001 | Gutzmer et al. | 379/27.05 |
| 6,351,533 B1 * | 2/2002 | Parrott | 379/412 |

FOREIGN PATENT DOCUMENTS

JP  H2-180297  7/1990  ............ H02H/3/02

* cited by examiner

*Primary Examiner*—Fan Tsang
*Assistant Examiner*—Ovidio Escalante
(74) *Attorney, Agent, or Firm*—Workman Nydegger (57) ABSTRACT

A novel line-current protection circuit for detecting excessive line current from a telephone line and protecting line interface circuitry from the excessive line current is presented. The protection circuit is adapted to detect when an excessive current is present on the tip and ring lines indicative of the misconnection of the modem or other line interface device with a telephone network that presents an incompatible interface standard. The preferred embodiment appreciates the multimode hold current specifications throughout the world and evaluates the connection of the line interface circuit with a telephone line to determine the compatibility therewith. When excessive line current is detected, the line-protection circuit switches the vulnerable line interface out of the circuit. When compatible line current levels are detected, the present invention reconfigures the configurable hold circuit into its original operating (e.g., non-testing) state for call processing.

12 Claims, 5 Drawing Sheets

LINE CURRENT PROTECTION CIRCUIT AND METHOD FOR LINEAR AND NONLINEAR HOLD CIRCUIT

BACKGROUND OF THE INVENTION

1. The Field of the Invention

This invention relates to modem communication systems that are used by computer equipment to communicate data across public or private telephone lines. More particularly, the invention relates to a line-current protection circuit that protects modem circuitry from being damaged by an excessively high line current that can be supplied via the telephone line in the event of misconnection.

2. Background Art

Increasingly, users of personal computers and related computer equipment rely on the ability to utilize public and private telephone lines to transmit and receive data. This capability dramatically increases the value of the computer, and the productivity of the computer user. As the number of remotely accessible public and private networks, databases, computer-based bulletin boards and related computer services continues to expand, the need for this communication capability will continue to grow.

As is well known, computer equipment, such as personal computers, communicate across telephone lines via a piece of equipment known as a "modem." The term modem is an acronym derived from the phrase "modulator-demodulator," which is descriptive of the basic function performed by the modem. A modem permits the personal computer, which is a digital device, to be interfaced with telephone lines by modulating the outgoing digital data so that it is compatible with telephone networks, which are designed to handle analog signals (e.g., speech traffic). Similarly, the modem reverses that process by demodulating incoming analog data from the telephone line so that it is in a digital form that is useable by the computer.

The manner in which telephone equipment, such as a modem, must electrically interface with the public telephone system has also been standardized so as to provide a compatible interface. Generally, modem manufacturers must provide an electrical line interface that moderates all signals or energy being input by the modem into the telephone line. The Federal Communications Commission (FCC) and the various telephone companies require this standard interface. The line interface protects the telephone lines and central telephone systems from being damaged, and thereby insures the integrity and quality of transmissions over the telephone lines.

This line interface circuitry is referred to as the Data Access Arrangement (DAA) circuit. The DAA line interface circuit provides an impedance match between the telephone equipment and the telephone line, and it also isolates and protects the telephone equipment from transient signals and other electrical disturbances that may be present on the telephone line. The DAA line interface circuit also protects the telephone line from any disabling electrical influences that may be generated by the telephone equipment (such as a modem). For example, the public telephone system could be damaged if, instead of transmitting frequency signals, the modem were to inadvertently inject DC power into the telephone line. This situation is avoided because the modem must incorporate the FCC mandated DAA line interface circuit, thereby ensuring that such a damaging signal is not inadvertently transmitted onto the public telephone lines.

As already noted, modems are increasingly being used to interconnect computers via public telephone lines. Initially, modems were largely configured as external accessory units, housed in their own cases, and attached to a port-connector located on the personal computer via a cable (usually a RS-232 port and cable). The external modem is then electrically connected to the telephone line via a standard RJ-type connection scheme, as discussed above. Further, an external modem would be equipped with the standard DAA line interface circuitry, as also described above.

External modems are, and will continue to be, widely used. However, with the increased popularity of smaller portable computers (referred to variously as laptop, notebook, sub-notebook or palm-top computers), external modems are less desirable because of their cumbersome size, their need for an additional cable and computer port and their consequent lack of portability. As such, the external modem is simply not conducive to the needs of a portable computer user. In response to this drawback, smaller modems have been developed that are formed as an integral component within the portable computer. This type of internal modem is located within the housing of the portable computer such that it may be directly interfaced with the telephone line via an RJ-11 physical/electrical media connector and associated cable. The internal modem is also necessarily equipped with the required DAA line interface circuitry.

Although such internal modems are more conducive to the portability requirements of a portable computer, they have several drawbacks. For instance, as an integral component, such an internal modem cannot be easily interchanged with other computers. Further, these types of internal modems also take up limited physical space within the portable computer, often at the expense of other computer components, such as an internal disk drive. Further, as computer housings have continued to be downsized—even to the extent of being hand-held—internal spatial restrictions have necessitated that modems be even further reduced in size, without giving up functionality.

Such requirements have resulted in the establishment of standards for the internal accessories of the computer. One set of standards applicable to memory cards has been developed by the Personal Computer Memory Card International Association (PCMCIA). This organization is comprised of hundreds of manufacturers of memory cards and related peripheral equipment. The PCMCIA has published specifications setting forth the spatial standard for all memory cards used in down-sized computers as being restricted to a rectangular space approximately 55 millimeters in width, 85 millimeters in length, and 5 millimeters in depth (commonly referred to as the PCMCIA Type II standard).

In keeping with the PCMCIA standards for memory cards, internal modem manufacturers have adopted the same spatial standards for use with their down-sized modem cards. By complying with the standards established by PCMCIA for memory cards, modem card manufacturers have assured themselves of compatibility and spatial conformity with computers utilizing and complying with the PCMCIA specifications.

The constraints imposed by the PCMCIA specification have resulted in the development of "credit card" sized modem cards. Thus, most of the components formerly housed in an external or integral modem are now contained within a credit-card sized, PCMCIA card. As with any PCMCIA component, a PCMCIA modem card is merely inserted into any computer equipped with a PCMCIA compliant socket. In this way, a PCMCIA modem is interchangeable with other computers, and requires only a minimal amount of physical space.

Although much reduced in size, a PCMCIA modem is interfaced with an external telephone subscriber line in the same manner as an external or internal modem. Thus, a PCMCIA modem can be connected to the telephone line via a standard, RJ-type connector interface and cable. Further, the PCMCIA modem card also includes the standard DAA line interface circuitry previously discussed.

Because the PCMCIA modem card is equipped with a standard RJ-type connector, portable computer users can connect to a telephone line and communicate from almost anywhere in the world. Although this is an important advantage of a PCMCIA modem equipped portable computer, the capability also raises an important problem.

Many offices, hotels, schools and similar buildings are wired such that the telephone equipment contained within the building is not connected directly to the public telephone system. Rather, buildings are increasingly equipped with "Private Branch Exchanges" (PBX). A PBX is an automatic switching system that is used to interconnect terminal equipment, such as telephone sets, within a building or campus of buildings. When communication is required outside of the building, the PBX will act as a gateway to the public telephone network.

Typically, telephone equipment is connected to a PBX installation with a standard RJ-type connector, as described above. However, although the physical connection between the PBX and the telephone equipment is the same, some PBX equipment utilizes the electrical wires, or leads, contained within the RJ-11 connection in a manner different from the public telephone network. For example, some PBX systems utilize the two center leads of an RJ-11 connector, commonly referred to as the "tip" and the "ring" leads, in a manner that is significantly different from a public telephone company. More specifically, these PBXs utilize the tip and ring leads to supply power to the specifically designed PBX telephone sets. This power is usually supplied as a differential DC voltage—typically in the range of 12 to 90 volts—that is applied across the tip and ring leads. However, no resistance is supplied to limit the current supplied. In contrast, the public telephone company places approximately 48 volts across the tip and ring leads, but the current is limited by a resistance of 400 Ohms to 1750 Ohms placed in series with the 48 volt source (thereby resulting a line-current that is usually less than around 120 mA.).

Thus, problems can arise when a piece of telephone equipment, such as a PCMCIA modem, is plugged into a RJ-type telephone jack connected to a PBX. If the PBX utilizes the tip and ring leads in the manner described above, the higher supply voltage of the PBX is applied across the DAA line interface circuitry. Since the resulting current drawn by the DAA circuitry is not limited, and thereby excessively high (i.e., greater than the maximum acceptable level of approximately 120 mA.), the DAA circuitry can be destroyed, and the PCMCIA modem thereby rendered inoperative. This problem is exacerbated by the fact that a portable computer user is usually unaware as to whether a particular RJ-11 (or similar RJ-type connector) telephone jack is connected to such a PBX. Consequently, the user may inadvertently plug the PCMCIA modem into such a "standard looking" jack, and thereby render the modem inoperative.

Solutions to this particular problem have heretofore not been entirely satisfactory. One solution is to protect the DAA line interface circuitry with a fuse type device. If the PCMCIA modem is taken "off-hook" while connected to a PBX that supplies an excessively high current, the fuse or fusible resistor will open, and thereby protect the DAA line interface circuitry. However, the fuse must then be physically replaced before the modem is again operative. Although this approach may work in an external type modem, wherein the fuse is relatively easy to access and replace, it is not practical in a PCMCIA modem card, wherein the electrical components are miniaturized and disposed within a sealed enclosure. Typically, the PCMCIA card must be returned to the manufacturer to have the fuse replaced—a costly and time consuming process.

Further, as is well known, the reaction time of a fuse is relatively slow and often unpredictable. Since fuses are generally slow to react to an excessive current, the DAA line interface circuitry must utilize components that are rated higher (and are thus physically larger) to compensate for the additional wattage consumed before the fuse reacts. This is not practical in a PCMCIA card environment, wherein physical space is extremely limited.

Finally, as noted above, the portable computer user is often unaware that a particular telephone jack is connected to a PBX system that could cause damage to the PCMCIA modem's DAA circuitry. Thus, even if a PCMCIA modem card is equipped with a fuse, and the modem is inadvertently connected to such a PBX, the modem will no longer be operable because the fuse remains open. The user typically will not know why the PCMCIA modem card has failed and is no longer operative. Diagnosis of the problem is very difficult—again resulting in a costly and a time-consuming process.

Similar "fuse" like devices have the same drawbacks. For instance, circuit breaking or current limiting devices are also generally slow to react. Further, these types of devices are relatively large, and again cannot physically fit within the limited space of a PCMCIA card.

A further problem arises when a multiplicity of hold current standards are employed. For example, it is known that the United States embraced an "off-hook" or hold current profile having a linear voltage and current outline with respect to the voltage and current presented to the modem. Such profile represents boundaries within which corresponding equipment should operate in order to properly signal to the central office on the telephone line that the modem or other device is in an off-hook state. While this linear hold current standard has been adopted by other countries, it is known that a significant number of countries have adopted various other "off-hook" profiles that take on various other voltage and current outlines. Most notably, and other prevailing standard that is commonly employed is known as the TBR21 standard. This standard exhibits a non-linear voltage and current profile. However, this non-linear profile more closely approximates the linear profile voltage and current specifications than the PBX specifications. Therefore, there exists a need to be able to accommodate a particular hold-current modem to which the modem has been previously configured while enabling the evaluation of the telephone line and its compatibility with the modem to which it has been connected. It should be reiterated that the evaluation all the voltage and current on the telephone line as presented to the modem or other device must be performed in a very timely manner in order to preclude, or at least minimize, damage to either the modem or other device is connected to the telephone line.

Therefore, there remains a need for a line-current protection circuit that will insure that the DAA line interface circuitry is not damaged when inadvertently subjected to an excessively high current.

OBJECTS AND BRIEF SUMMARY OF THE INVENTION

The present invention has been developed in response to the present state of the art, and in particular, in response to the problems and needs in the art not heretofore fully or completely solved by line current protection schemes used in connection with modem cards. However, it is not intended that the apparatus of the present invention will necessarily be limited solely to modem cards, since it may also find useful application with other devices requiring protection from exposure to excessive line-current conditions. Thus, it is an overall object of the present invention to provide a line-current protection circuit that provides for cost effective and reliable protection of circuitry from an excessive line current condition.

Another object of the present invention is to provide a line-current protection circuit that utilizes electrical components that physically can be used within the limited space of a miniaturized or mobile architecture such as a PCMCIA-architecture card.

Yet another object of the present invention is to provide a line-current protection circuit that is capable of detecting and responding to an excessive line current condition fast enough so as to insure that standard DAA line interface components used within a PCMCIA modem card are not damaged.

Another object of the present invention is to provide a line-current protection circuit that is capable of detecting and not responding to a transient signal present on the telephone line.

Still another object of the present invention is to provide a line-current protection circuit which is automatically reset after the excessive line current condition is removed, so that there is no need to physically remove or otherwise replace circuit components.

A further object of the present invention is to provide a line current protection circuit capable of indicating the presence of an excessive line current condition allowing the PCMCIA modem user to be aware of the condition and the reason for the modem's inoperability.

A yet further object of the invention is to provide a line current protection circuit capable of operating in a plurality of hold-current modes and detecting when a telephone line, having characteristics outside of the parameters of the specific modes, is connected to a modem.

Additional objects and advantages of the present invention will become more fully apparent from the following detailed description taken in conjunction with the drawings and claims, or may be learned by the practice of the invention.

Briefly summarized, the foregoing and other objects are achieved with a novel line-current protection circuit. The protection circuit is particularly advantageous in that it may be used within small architecture modem configurations such as a PCMCIA-architecture modem card. The protection circuit is oriented for placement in series with the tip lead of a telephone subscriber loop once the PCMCIA modem is plugged into the telephone subscriber loop via a standard RJ-type, or similar, connection. When connected to the telephone line in this manner, a differential DC voltage is presented to the DAA line interface circuitry across the tip and the ring leads of the telephone line. The line protection circuit configures the DAA to operate in a linear mode for purposes of testing for the presence of excess current and voltage which could damage the DAA. If an excessive line current is presented to the DAA line interface circuitry, that condition will be detected by the protection circuit, which will then respond by automatically disconnecting the DAA circuitry from between the tip and ring leads. This automatic disconnection occurs rapidly, before any damage is caused to the DAA circuit electrical components. Further, the connection will not be permitted to be reestablished until such time as the excessive line current condition is removed. If excessive line current is not present, then the DAA is configured to operate in the mode as specified either by the user or manufacturer as originally configured.

The line-current protection circuit is comprised of a configurable hold circuit means for configuring the line interface circuit to operate between at least a first linear mode and a second nonlinear mode. The configurable hold circuit means is controlled by a controller means which is capable of reconfiguring the configurable hold circuit means and activating/deactivating a relay means, which is connected between the DAA interface circuitry and the tip lead of the telephone line, and which selectively provides for either an open or a closed connection between the DAA circuitry and the tip and ring leads of the telephone line. The protection circuit is further comprised of a sensing or detection means, which is capable of detecting the magnitude of the line current that is presented to the DAA line interface circuitry. The results of the line current evaluation in the sensing means is conveyed to the controller means for evaluation which then causes the relay means to either open or close, depending on the magnitude of the line current. Thus, if the line current exceeds a predetermined maximum, such as approximately 120 mA, the current sensing or detection means will sense that condition and therefore cause control circuit means to direct the relay means to open the circuit connection between tip and ring leads. In this manner, excessive current does not reach the DAA line interface circuitry. When the detected current is not excessive, the controller means reconfigures the configurable hold circuit means to operate in the originally configured or operating mode.

In a preferred embodiment of the protection circuit of the present invention, the detection means is comprised of a current sensing means which is for providing an excessive line current signal when the magnitude of the line current presented to the DAA circuitry exceeds a predetermined magnitude.

Also in the preferred embodiment of the protection circuit of the present invention, the controller circuit means is comprised of executable instructions that perform steps of configuring the configurable hold circuit means into a test mode, which in the preferred embodiment is the linear mode, when the configurable hold circuit means is not already configured to the linear mode; detecting excessive line current from a sensing means; disconnecting the line interface circuit from the telephone line when excessive line current is detected; and when excessive line current is not detected, configuring the configurable hold circuit means into an operating mode, either linear or non-linear, as originally selected by the user or programmed by the manufacturer or other party.

The protection circuit may further include a backup fuse means, also connected between the DAA interface circuitry and the tip lead of the telephone line, which is for opening the connection between the DAA interface circuitry and the tip and ring leads if the line current were to exceed a second predetermined maximum magnitude. This fuse means acts as a backup protection in the event that the components making up the relay means or detector means were to fail.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are therefore not to be considered limiting of its scope, the invention in its presently understood best mode for making and using the same will be described with additional specificity and detail through the use of the accompanying drawings in which.

DETAILED DESCRIPTION OF THE PREFERRED EMBODIMENTS

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Figure 1:
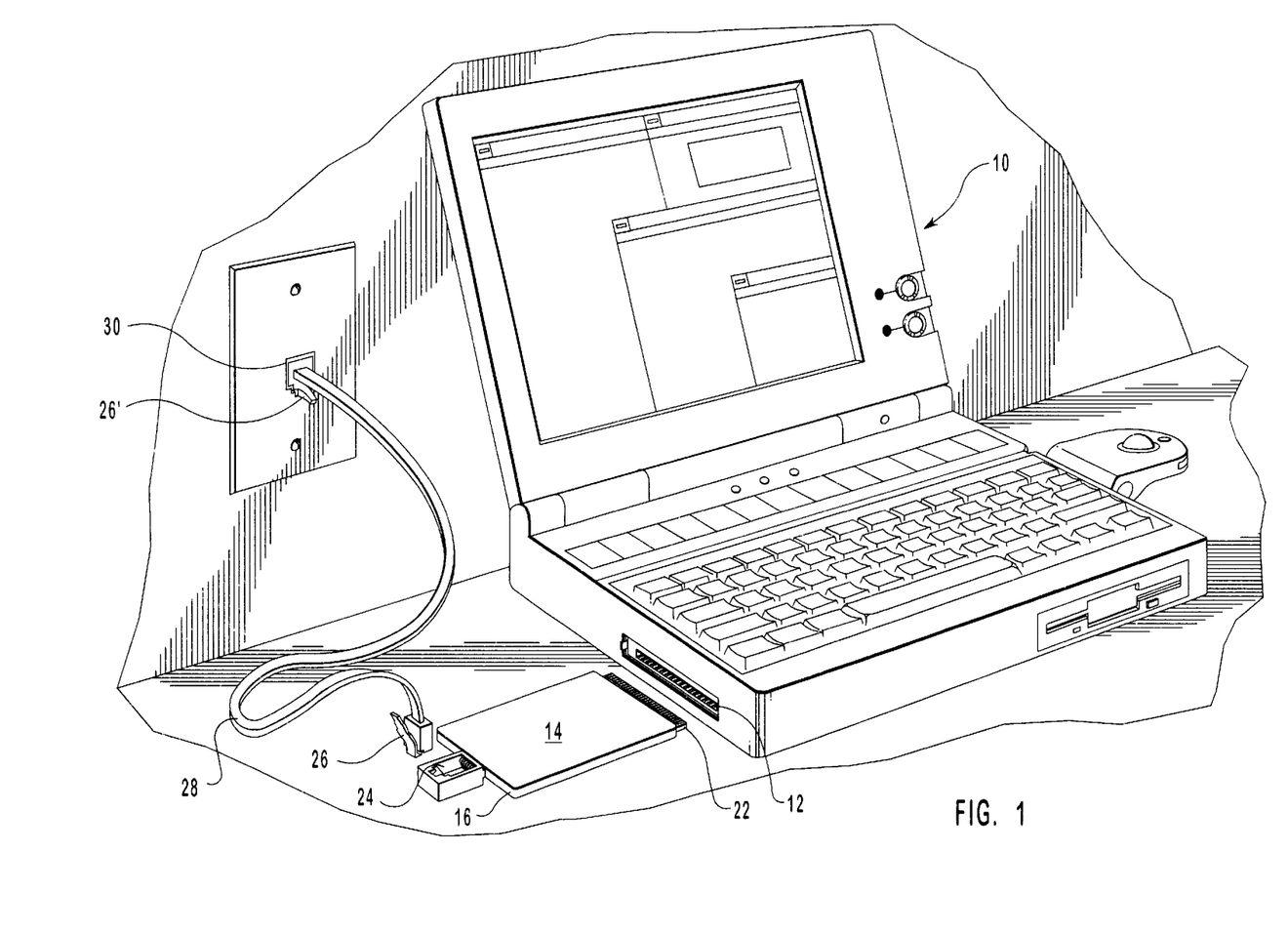
FIG. 1 is a perspective view of one environment in which the protection circuit of the present invention may be used.

Referring now to FIG. 1, illustrated is a typical environment in which the line-current protection circuit of the present invention can be used. A portable computer, designated generally at 10, is shown as having a PCMCIA socket 12. The PCMCIA socket 12 is designed to be capable of receiving any PCMCIA-architecture compliant card, as for instance the PCMCIA modem card illustrated and designated generally at 14. As is shown, modem card 14 is a standard PCMCIA card, having a plastic type enclosure 16 in which is disposed a printed circuit board 18 (shown in FIG. 2) onto which is placed the modem's various electrical components 20 (also shown in FIG. 2). Formed along one edge of the PCMCIA modem card 14 is an edge connector 22, which is designed to be detachably received within a corresponding connector slot (not shown) disposed within the PCMCIA socket 12. In this way, the PCMCIA modem card 14 is electrically interfaced with the portable computer 10.

Formed on the opposite edge of the PCMCIA modem card 14 is a standard RJ-11 socket-connector 24, which is designed to detachably receive a standard RJ-11 plug 26 and telephone wire 28 assembly. The opposite end of the wire 28 is also equipped with a RJ-11 plug 26', which is then detachably received within a RJ-11 telephone-jack 30, i.e., as would commonly be found on the wall of a office, etc. The telephone-jack 30 is in turn electrically connected to the public telephone lines, either directly or via a Private Branch Exchange (not shown). In this way, the PCMCIA modem card 14 is electrically connected to a telephone subscriber loop.

Figure 2:
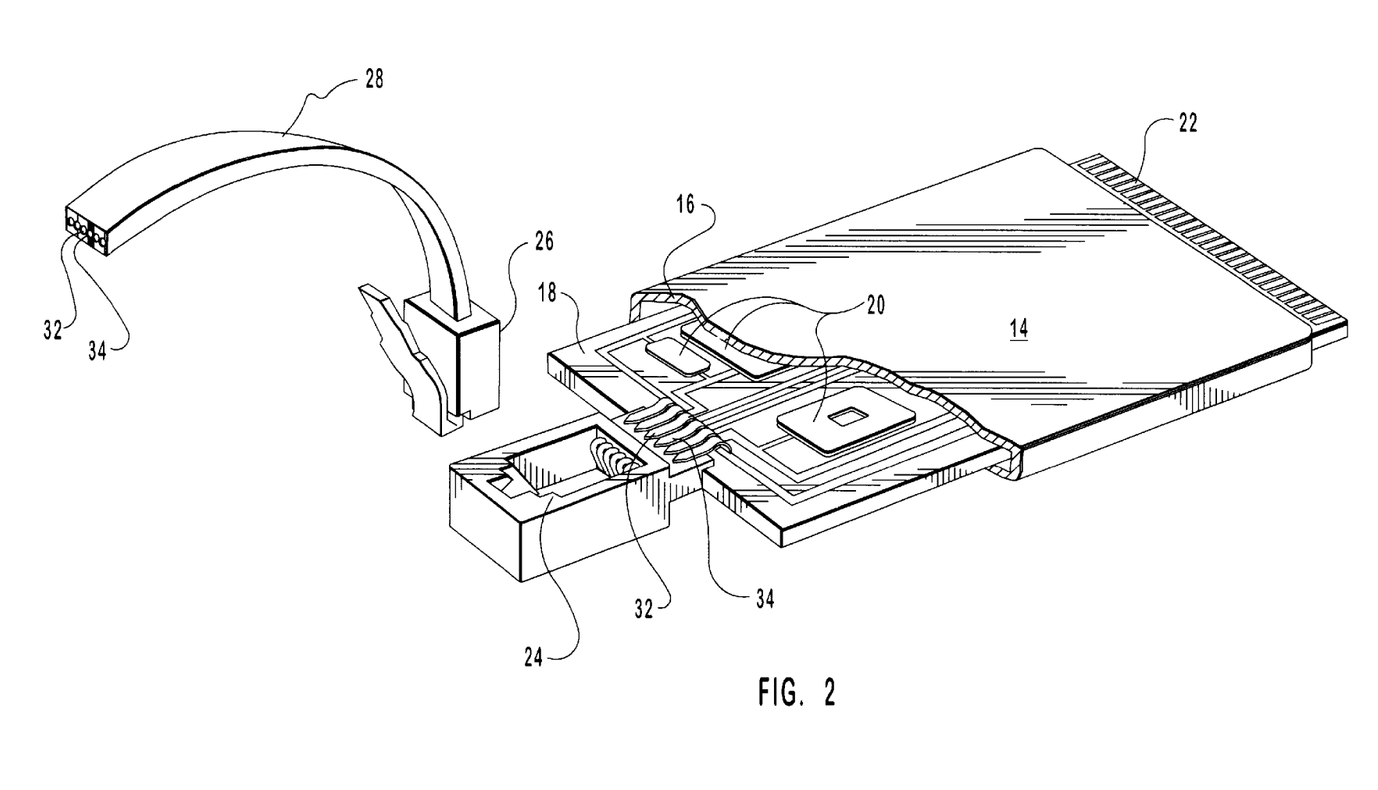
FIG. 2 is an exploded perspective view, illustrating a partial cross-sectional view of a PCMCIA modem card, the circuit components contained thereon, and the manner in which the card typically is connected to an external telephone subscriber loop, including the incoming tip and ring leads of an RJ-11 6-position connection.

Referring now to FIG. 2, illustrated is an enlarged perspective view of the PCMCIA modem card 14 of FIG. 1. As generally discussed, modem card 14 is equipped with a standard RJ-11 socket connector 24, designed to detachably receive a twisted-pair telephone wire 28 via a RJ-11 plug 26 assembly. It will be appreciated that this RJ-11 connection scheme, although described as an RJ-11 connector, could be any type of RJ-type connector. For instance, some PBX systems utilize an RJ-45 connector.

Typically, the telephone wire 28 will be comprised of six (6) separate wire leads. Although the number of wire leads may vary (for instance, there may be eight or four leads), there are generally a minimum of two center lead wires, referred to as a tip lead 32 and a ring lead 34. As is further shown, the tip 32 and ring 34 leads are electrically interfaced with the circuit components 20 contained on the printed circuit board 18 contained within the PCMCIA enclosure 16. As discussed above, a portion of the circuit components 20 comprise a portion of line interface circuitry, commonly referred to as a Data Access Arrangement circuit, which acts as an electrical interface between the telephone line and the rest of the modem circuitry.

Figure 3:
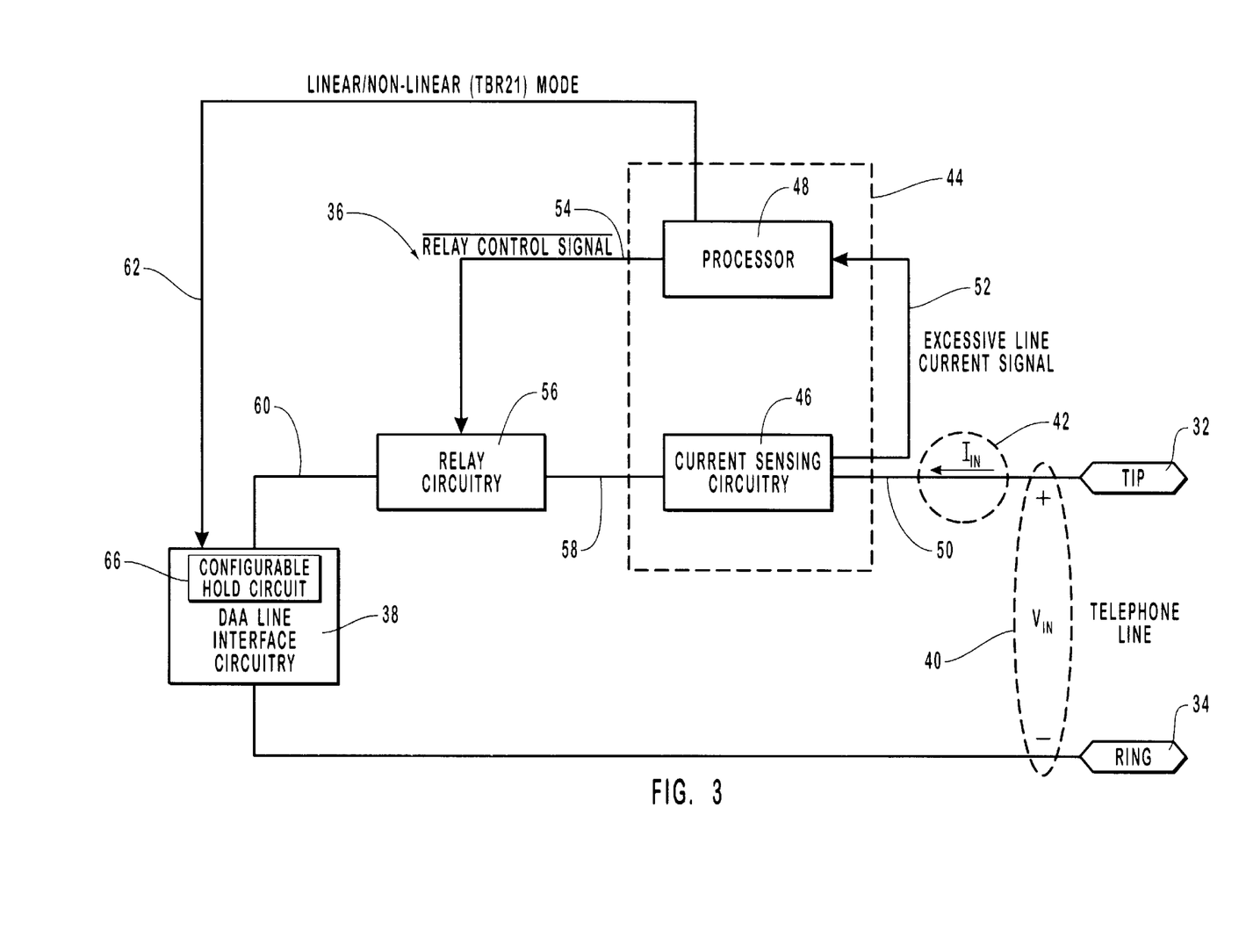
FIG. 3 is a functional block diagram which schematically illustrates the primary components of one presently preferred line-current protection circuit of the present invention.

Referring now to FIG. 3, a functional block diagram illustrating one presently preferred embodiment of the current invention is shown. The protection circuit, designated generally at 36, comprises, by way of example, relay means for selectively providing an open or a closed connection between the DAA Line Interface Circuitry 38 and the tip and the ring leads 32, 34; and a current sensing or detection means, which detects the magnitude of any line current that is being supplied to the DAA line interface circuitry 38. The control circuit means causes the relay means to open or close, depending on the magnitude of that line current. In one preferred embodiment, the detection means comprises, for example, a current sensing means for providing an "Excessive Line Current" signal when the magnitude of the line current presented to the DAA circuitry 38 via the tip lead 32 exceeds a predetermined magnitude, such as approximately 120 mA. A controller means receives the Excessive Line Current signal from the sensing means and causes the relay means to be either opened or closed depending on the status of the Excessive Line Current signal. The control means also configures the hold circuit means to operate either in linear or nonlinear modes.

With continued reference to FIG. 3, when the PCMCIA card 14 is detachably connected to a telephone subscriber loop, the tip 32 and the ring 34 leads are electrically connected across the DAA circuitry 38, and a DC voltage potential $V_{IN}$, indicated at 40, will be present across the tip and ring leads 32, 34. The magnitude of that voltage will vary, depending on the nature of the telephone subscriber loop to which the modem card 14 is connected. For example, if the subscriber loop is connected directly to the public telephone system, the voltage will be approximately 48 volts, limited by a series resistance of approximately 400

Ohms to 1750 Ohms. In that case, the magnitude of the resulting current $I_{IN}$, shown as 42, is limited to a maximum of approximately 120 mA.

If the subscriber loop is connected directly to the public telephone system in a country subscribing to the TBR21 line standard, the voltage will be approximately −48 volts, limited by a series resistance of approximately 400 Ohms to 2400 Ohms. In that case, the magnitude of the resulting current $I_{IN}$, shown as 42, is limited to a maximum of approximately 120 mA. Those skilled in the art appreciate that the voltage and current profile of the TBR21 standard defines a current wall (i.e., the origin of its description as the "non-linear" mode standard) at approximately 60 mA. Because of the resulting discontinuous non-linear voltage and current profile, the linear profile is selected for testing for an overvoltage condition due to the fact that the voltage and current for both linear and non-linear modes can generally be circumscribed by the single linear standard. Hence, during testing, only the linear mode is used and the originally configured or operating mode (i.e., linear of non-linear) is restored upon successful completion of the excessive line current test.

In contrast, if the modem card 14 is connected to the subscriber loop of a PBX system (not shown), the voltage $V_{IN}$ can be anywhere in the range of 12 to 90 volts—without any resistance to the resulting current $I_{IN}$. In that case, the magnitude of current $I_{IN}$ that is supplied to the DAA circuitry 38 can exceed the desired maximum magnitude of approximately 120 mA, and thereby destroy the DAA circuit components, rendering the modem card 14 inoperative.

As is shown in FIG. 3, in one presently preferred embodiment, detection means is comprised of, the functional components contained within the dotted box 44. In this particular embodiment, detection means is comprised of a current sensing means, as for example current sensing circuitry 46, and controller or control circuit means, as for example programmable digital processor 48.

With continued reference to FIG. 3, the tip lead 32 of the incoming telephone line 28 is connected in series with the current sensing circuitry 46, as is schematically shown at line 50. The current sensing circuitry 46 is thereby positioned to detect the magnitude of line current $I_{IN}$ being supplied to the DAA circuitry 38. If the magnitude of that current exceeds a predetermined maximum, which in the preferred embodiment is approximately 120 mA, the current sensing circuitry 46 will generate an Excessive Line Current signal, as is schematically shown at line 52. The Excessive Line Current signal is then electrically connected, via line 52, to an input of the programmable digital processor 48.

Using programming techniques that are well known in the art, the digital processor 48 programmably monitors the status of the Excessive Line Current signal present on line 52. If the line current $I_{IN}$ 42 exceeds the maximum allowable level of 120 mA, the current sensing circuitry 46 will indicate the fault condition by asserting the Excessive Line Current signal input to the digital processor 48. The digital processor 48 is programmed to respond to the fault condition by asserting a Relay Control Signal, as is indicated at line 54.

A configuration path or control line(s) 62 provide a signaling path between the control circuit means and the line interface circuitry, and more particularly, the configurable hold circuit 66. Line(s) 62 facilitate the configuration of configurable hold circuit 66 into a plurality of modes, most notably a linear mode and a nonlinear (e.g., TBR21) mode. While FIG. 3 depicts line 62 as being a single control line, it is contemplated that the actual configuration of configurable hold circuit may take the form of the transferring of a command or other data set up provision from the control circuit or processor means and the configurable hold circuit means.

FIG. 3 further illustrates how protection circuit 36 is comprised with a relay means, as for example relay circuitry 56. Relay circuitry 56 is also connected in series with the tip lead 32, as is schematically illustrated at line 58. Relay circuitry 56 can be operated so as to selectively open or close the circuit connection between the DAA circuitry 38 and the tip and the ring leads 32, 34. The relay circuitry 56 will be opened or closed depending on the status of the Relay Control Signal generated by the digital processor 48, as is shown at line 54. Thus, in this particular embodiment, if Relay Control Signal is asserted, thereby indicating an excessive line current fault condition (i.e., line current $I_{IN}$ 42 exceeds 120 mA), relay circuitry 56 will open, and prevent the line current $I_{IN}$ from damaging the DAA circuitry 38. This condition is otherwise referred to as an "On-Hook" state, wherein the PCMCIA modem card 14 is effectively disconnected from the telephone line. When the line-current is below the maximum allowable amount (i.e., the modem card 14 is plugged in to a telephone socket having a standard voltage present across the tip and the ring leads 32, 34), the Relay Control Signal will not be asserted by digital processor 48, and the relay circuit 56 will close, thereby completing the circuit connection between the DAA circuit 38 and the tip and ring leads 32, 34, as is schematically shown at line 60. This condition is otherwise known as an "Off-Hook" state, wherein the modem card 14 can send and receive data via the telephone line.

An important advantage of the protection circuit 36 is its capability to automatically and dynamically open or close the circuit connection depending on the testing configuration and resulting magnitude of the line-current $I_{IN}$. Advantageously, when the fault condition is removed (i.e., the user plugs the modem card into a telephone-jack not having an excessive line-current $I_{IN}$), the modem will function correctly. There is no need to have components, such as burned fuses, replaced. Further, in the preferred embodiment, the digital processor 48 is the processor which is used to perform the PCMCIA modem's general command processing functions and the host (e.g., the portable computer utilizing the PCMCIA modem card) interface functions. Thus, when a fault-condition does occur, and the digital processor causes the relay circuitry 56 to open, the digital processor 48 will also be programmed to cause a text string signal to be displayed on the screen of the host computer. This text screen will inform the user that an excessive line-current condition exists at the telephone-jack in which the PCMCIA-modem is connected. In this way, the user is alerted as to why the modem is not functioning.

Figure 4:
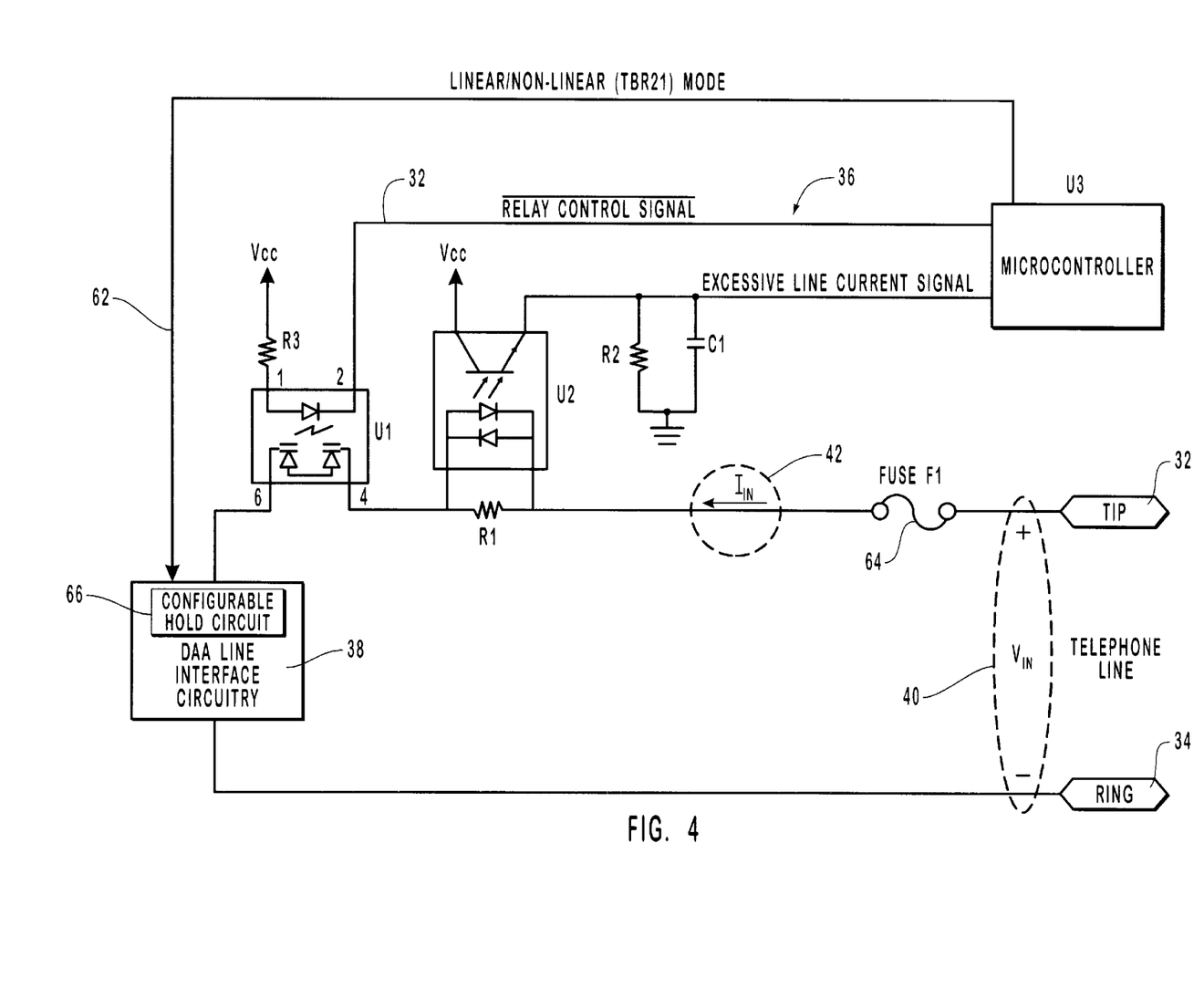
FIG. 4 is a detailed electrical schematic diagram which illustrates, as an example, the presently preferred embodiment and presently understood best mode for implementing the line-current protection circuit of the present invention.

Referring now to FIG. 4, an electrical schematic of one presently preferred embodiment of the protection circuit 36 is shown. The current sensing circuitry (46 in FIG. 3) is comprised of, for example, a sensing resistor R1 placed in series with the tip lead 32 so that line-current $I_{IN}$ passes therethrough. It will be appreciated that the sensing resistor R1 could alternatively be placed in series with the ring lead 34, and still have line-current $I_{IN}$ pass therethrough. Connected across the sensing resistor R1 is an optoelectronic device, such as photo-coupler U2. Thus, line-current $I_{IN}$ will generate a voltage across sensing resistor R1, the magnitude of which will vary in proportion with the magnitude of $I_{IN}$ in compliance with Ohm's law. As long as $I_{IN}$ is sufficiently low (i.e., below approximately 120 mA), the photo-responsive transistor portion of U2 will not conduct, and the Excessive Line Current signal output will stay grounded through pull-down resistor R2. Once the magnitude of line-current $I_{IN}$ exceeds an allowable maximum, as for example 120 mA, the resulting voltage across R1 will cause the corresponding photo-emitting diode of device U2 to turn on. The photo-responsive transistor portion of U2 will respond by conducting, and thereby asserting the Excessive Line Current Signal, by pulling it high.

False signals, such as transient spikes on the output of photo-coupler U2, are avoided by placing a capacitor C1 in parallel with the pull-down resistor R2. Alternatively, capacitor C1 could be placed in parallel with sensing resistor R1, on the photo-responsive transistor of U2. Also, C1 can be eliminated completely and any false signals can instead be detected by the digital processor/microcontroller U3. In this embodiment, the microcontroller U3 will be programmed to check for the presence of the Excessive Line Current Signal twice. If the signal is detected, the processor will wait for an amount of time, such as one millisecond, and then recheck the status of the signal. In this way, the microcontroller U3 can insure that the first occurrence of the signal was not merely a transient, false signal, as may be caused by line noise or other conditions, or that may result when the modem is connected to certain analog PBXes.

The photo-coupler U2 shown in FIG. 4 is available as a single component, mounted in a small outline package, which can easily be mounted within the PCMCIA card 14 enclosure. Further, the device U2 provides the current sensing function, and yet has galvanic isolation from the telephone line, and thus has no need for an earth-ground voltage measurement reference and is largely impervious to large common-mode 60 Hz noise signals. One presently preferred photo-coupler U2 is the device made by NEC Corporation and identified by the part number PS2705-1.

As discussed, the Excessive Line Current Signal is supplied to an input of a digital processor (48 in FIG. 3). In the preferred embodiment, the digital processor 48 is comprised of a microcontroller U3, which is used to perform the PCMCIA modem's general command processing functions and the host (e.g., the portable computer utilizing the PCMCIA modem card) interface functions. A preferred microcontroller U3 is available as part of a chip-set manufactured and sold by Rockwell Corporation and known as the RC96ACL/RC144ACL integrated data/fax/voice modem device set family. This microcontroller U3 is more particularly known as a Rockwell C29 or C39 microcomputer. It will be appreciated that various other digital microprocessors, which are well known in the art, could also be used.

Microcontroller U3 is programmed, using techniques that are well known in the art, to continuously monitor the Excessive Line Current signal output by Opto-Coupler U2. When line-current $I_{IN}$ exceeds approximately 120 mA, the signal is asserted, and the microcontroller responds by asserting the Relay Control signal, which is electrically connected to relay circuitry (56 in FIG. 3). The microcontroller is also programmed to execute the steps and instructions as detailed in FIG. 5, including the capability of reconfiguring the configurable hold circuit from an operational configuration to a testing configuration and back, responding to off-hook conditions (e.g., ring signal receipt and user invoked call initiation), and traditional call processing.

The relay circuitry is comprised of, for example, a solid-state relay device, which in the preferred embodiment is a photo-MOS relay U1, sold by Aromat and known by the part number AQV214S. The Relay Control Signal is input to the relay device, as is schematically shown at line 32, so as to control the current flow through the LED portion of the photo-MOS relay U1. Thus, when a fault condition exists (i.e., excessive line current), microcontroller U3 asserts Relay Control Signal, thereby causing a non-conduct state through the relay device and resulting in an open circuit, or "On-Hook" state. In this state, line-current $I_{IN}$ does not reach the DAA line circuitry. In contrast, when Relay Control Signal is not asserted, the relay is in a closed position and the PCMCIA modem will be in an "Off-Hook" state, and function as intended.

Importantly, the protection circuit 36, using the above-described components, is capable of detecting and responding to an excessively high line-current in the range of from 1 to 2 milliseconds. This insures that none of the DAA line interface circuit components are damaged by lingering high current.

FIG. 4 also illustrates the preferred embodiment as having a backup fuse means, such as fuse 64, which is connected in series with the tip lead 32 and the DAA line interface circuitry. Fuse 64 is for providing backup protection to the DAA line interface circuitry, and will open up the circuit connection in the event that the other circuit components fail, and the line-current $I_{IN}$ exceeds a second predetermined maximum magnitude, such as 250 mA.

Figure 5:
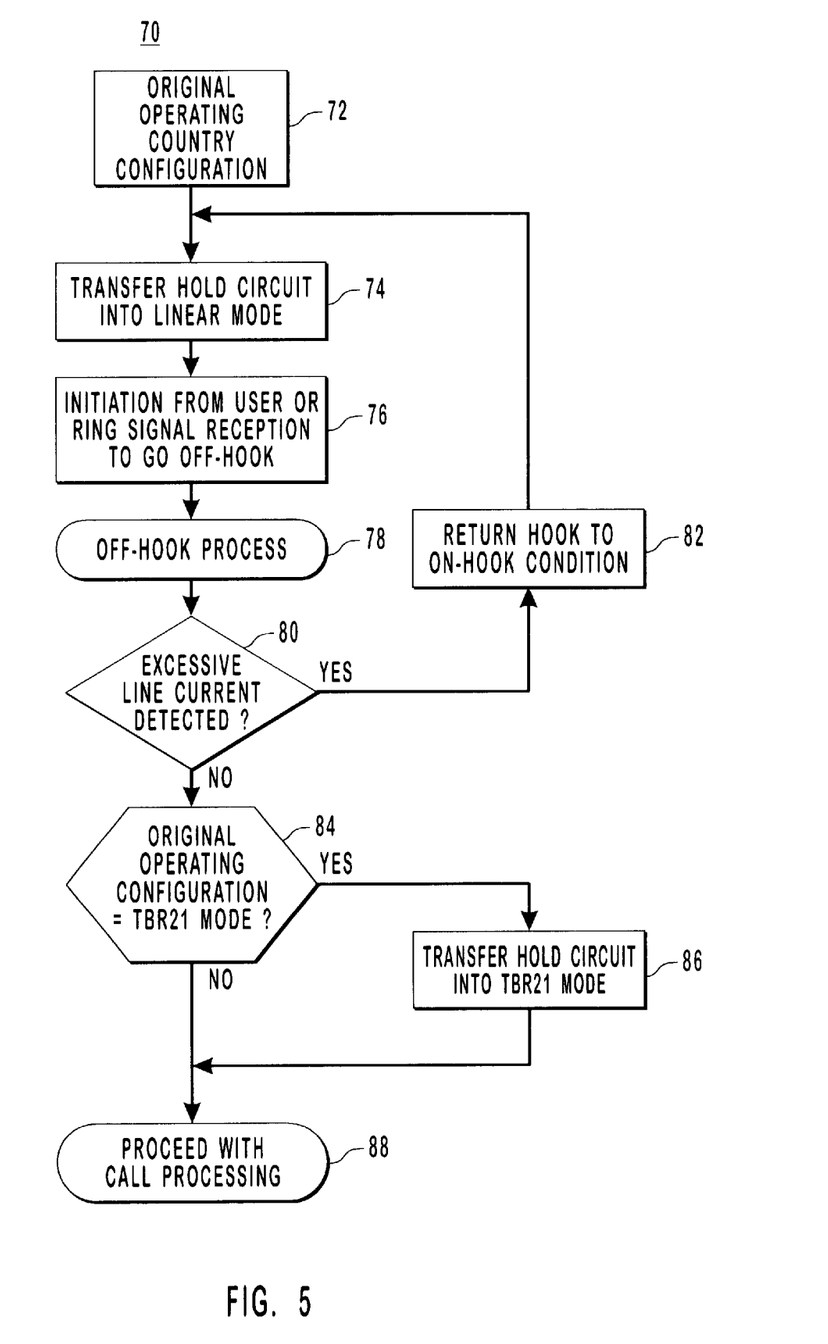
FIG. 5 is a flowchart depicting the processing steps for configuring the circuit for detecting excessive line current and reacting accordingly and returning to an operational configuration when appropriate, in accordance with a preferred embodiment of the present invention.

FIG. 5 depicts a flowchart for performing the steps of testing the parameters of a telephone line that is connected to the line interface circuit in order to determine if the parameters of the telephone line are within the operating parameters of the line interface circuit. The present invention addresses the problem of detecting excessive wattage when a DAA is configured and designed for connection with a linear or a non-linear (e.g., TBR21) telephone line, but could be damaged by the erroneous connection to a telephone line exhibiting other electrical standards such as a PBX connection.

The means for executing the steps of the flowchart as depicted in FIG. 5 are suitable for a computing environment in which the invention may be implemented. Although not required, the invention, and the steps of the flowchart in general, are implemented as executable code or instructions for execution by a microcontroller. While a microcontroller is depicted above, those skilled in the art appreciate that executable code may reside in a form of memory. While no such memory is expressly shown, it is well known in the art that memory may be included within embedded microcontrollers or memory in the form of ROM and RAM may be external to the microcontroller and is not shown in the present invention in an attempt to not confuse the more inventive aspects of the present embodiments.

Those skilled in the art will appreciate that the invention may be practiced in network computing environments with many types of computer system configurations, including personal computers, hand-held devices, multi-processor systems, or programmable electronics. The microcontroller as shown above executes instructions for caring-out the steps of the flowchart of FIG. 5 and such computer-executable instructions may be stored on computer-readable media including ROM, RAM, other magnetic media such as disks, optical media such as optical disks, as well as other imaginable configurations. All such embodiments are considered within the scope of the present invention.

While the process flow is generally shown as process 70 in FIG. 5, it is important to remember that such processing, in the preferred embodiment, is performed by digital processor or microcontroller U3, as shown in FIG. 4. It should also be appreciated that other implementations such as state machines could be implemented to carry out the steps as depicted in FIG. 5. FIG. 5 depicts a process 72 in a modem which is originally configured by either the user or another party, such as a manufacturer, to initialize the line interface circuitry in a compatible manner for interaction with the target telephone line standard. In the preferred embodiment, the original or operational configuration takes the form of either a linear or a non-linear (e. g., TBR 21) hold current specification. Such original configuration information is preferably stored in non-volatile memory and is referenced by the digital processor or microcontroller U3, all of FIG. 4.

In the preferred embodiment of the present invention, a linear configuration of a current sensing means is implemented. Therefore, in order to configure a hold circuit into a compatible test state, the configurable hold circuit of line interface circuitry 38 (FIG. 4) is programmed, in step 74, to operate in the linear mode for the duration of the excessive line current testing process. Those skilled in the art, appreciate that the method for programming the configurable hold circuit may take the form of a single control line 62 (FIGS. 3–4) or may also be command driven over a command bus implementation. The actual implementation of choice is dependent upon the specific interface available between the line interface circuitry and the digital process or microcontroller.

Subsequent to configuration step 72 which may be performed by various entities including a user who self configures a modem or a manufacturer who preconfigures a modem destined for a particular country or region, two additional steps are performed prior to actually measuring the current and voltage as presented by the telephone line to the modem. FIG. 5 depicts a first step 74 which verifies that the hold circuit is in a linear mode or alternatively, when the hold circuit was originally configured into a non-linear mode, configures the hold circuit into a linear mode. This step is performed since the current sensing means of the preferred embodiment is configured to evaluate the current and voltage conditions of a linear telephone line interface. It should be pointed out that non-linear telephone line characteristics, for the purposes of evaluating in a time-efficient manner, exhibit current and voltage characteristics that can also be sufficiently evaluated using a linear hold current profile.

The subsequent step, step 76, is largely implemented as a wait state that awaits the initiation from either an off-hook directive by a user, or the receipt of a ring signal from the telephone line. Such an indication is a directive to an off-Hook process, depicted as process 78, which performs the requisite switching of the hold circuit into a conductive state allowing the voltage and current from the telephone line to pass to the hold circuit via the current sensing means. While steps 74 and 76 are depicted in FIG. 5 occurring in a specific sequence, a reverse sequencing of steps 74 and 76 also function equally well in that the off-hook directive could initiate the reversion of the hold circuit into the linear mode.

FIG. 5 depicts a query step 80 which performs the actual detection of excessive line current through the current sensing means. Furthermore, in step 80 when excessive line current is detected, processing passes to a step 82 which performs the process of returning the line interface circuitry into an on-hook state. Such a process is performed by the control circuit means, and in the preferred embodiment, is accomplished through the switching of a relay means into an open circuit state.

When query state 80 does not detect an excessive line current state, processing passes to a query state 84 which determines if the original country configuration, step 72, was originally preconfigured into a configured linear mode, or whether the hold circuit needs to be reconfigured into a non-linear mode, (e.g.,TBR 21 mode) as depicted in step 86. Following the accurate reconfiguration of the hold circuit into its original or operating mode, and in the absence of excessive line current, call processing resumes in step 88.

In summary, the line-current protection circuit as described above addresses the previously unsolved problems in the prior art. The line-protection circuit, and method, insures that the line interface circuitry of a modem is not damaged when a modem is inadvertently connected to a telephone line having an excessive line current. Also, the protection circuit automatically resets when the fault conditions removed, and thus electrical components do not have to be replaced, or is any servicing required on the modem card. When the fault condition does exist, the protection circuit is capable of causing a message to be displayed, thereby notifying the user of the error condition. Finally, the protection circuit is able to distinguish between short duration, transient signals, and valid excessive line current conditions.

The process, as described in the present invention, finds application in multimode hold circuit configurations that are available in the form of global or configurable line interface circuits such as DAAs. The present invention may be embodied in other specific forms without departing from its spirit or essential characteristics. The described embodiments are to be considered in all respects only as illustrative and not restricted. The scope of the invention is, therefore, indicated by the appended claims rather than by the foregoing description. All changes which come within the meaning and range of equivalency of the claims are to be embraced within their scope.

What is claimed and desired to be secured by the United States patent is:

1. A communications device comprising:
   a) a line interface circuit disposed within the communications device and electrically connected to a communications line, the line interface circuit including a hold circuit that is capable of selectively configuring the line interface circuit to operate in a plurality of configuration modes, including at least a test mode and an operating mode, wherein each of the configuration modes provide a predefined voltage and current outline with respect to a voltage and a current presented to the line interface circuit;
   b) a sensing circuit connected with respect to the communications line so as to detect when the magnitude of a supply voltage present across the communications line presents a line-current to the interface circuit that exceeds a predetermined magnitude;
   c) a control circuit connected to the hold circuit so as to automatically cause the line interface circuit to operate in the test mode while the sensing circuit detects whether the line-current exceeds the predetermined magnitude, and to automatically cause the line interface circuit to operate in the operating mode if the line-current does not exceed the predetermined magnitude; and
   d) wherein the test mode accommodates a linear voltage and current profile, and the operating mode accommodates a non-linear voltage and current profile, the test mode and the operating mode being selectable by the control circuit via a hold circuit mode signal.

2. The communications device as recited in claim 1, wherein said operating mode complies with the TBR21 line circuit standards.

3. A method for detecting excessive line current from a telephone line and protecting a line interface circuit disposed within a communications device from said excessive line current, said method comprising the steps of:
   a) configuring the line interface circuit into one of a plurality of operating modes, wherein each of the operating modes provide a predefined voltage and current outline with respect to a voltage and a current presented to the line interface circuit;
   b) detecting the presence of an excessive line current received from the telephone line;
   c) when said excessive line current is detected, substantially disconnecting said line interface circuit from said telephone line so as to reduce the amount of line current from reaching the line interface circuit;
   d) when said excessive line current is not detected, automatically configuring the line interface circuit into a predetermined operating mode, said predetermined operating mode including one of a linear mode or a nonlinear mode as originally selected by a user of said line interface circuit.

4. The method, as recited in claim 3, wherein said step of detecting excessive line current, further comprises the steps of:
   a) configuring said line interface circuit into said linear mode; and
   b) upon receipt of one of a ring signal or an off-hook initiation by said user, causing the line interface circuit to go into an off-hook position.

5. The method, as recited in claim 3 wherein said step of configuring said line interface circuit into said operating mode, further comprises the steps of:
   a) when said line interface circuit was originally operably configured for operation in said linear mode, retaining said line interface circuitry in said linear mode; and
   b) when said line interface circuit was originally operably configured for operation in said nonlinear mode, configuring said line interface circuit in said nonlinear mode.

6. The method, as recited in claim 5, wherein said step of configuring said line interface circuit in the nonlinear mode comprises the step of configuring said line interface circuit according to the TBR21 line circuit standards.

7. A communications device comprising:
   a line interface circuit electrically connected to a communications line;
   a hold circuit that is capable of selectively configuring the line interface circuit to operate in at least a test mode and an operating mode;
   a sensing circuit electrically connected with respect to the communications line so as to detect when the magnitude of a supply voltage present across the communications line presents a line-current to the line interface circuit that exceeds a predetermined magnitude;
   a control circuit connected to the hold circuit so as to cause the line interface circuit to operate in the test mode while the sensing circuit detects whether the line-current exceeds the predetermined magnitude, and to cause the line interface circuit to operate in the operating mode if the line-current does not exceed the predetermined magnitude; and
   wherein the test mode accommodates a linear voltage and current profile, and the operating mode accommodates a non-linear voltage and current profile.

8. The communications device as recited in claim 7 wherein the operating mode complies with the TBR21 line circuit standards.

9. The communications device as recited in claim 7 wherein the control circuit comprises a programmable device that is interfaced with the sensing circuit and the hold circuit, the programmable device being configured so as to substantially prevent the line-current from reaching the line interface circuit in the event that the line-current exceeds the predetermined magnitude.

10. The communications device as recited in claim 9, wherein the programmable device substantially prevents the line-current from reaching the line interface circuit by causing a relay circuit, disposed between the communications line and the line interface circuit, to substantially open.

11. The communications device as recited in claim 7 wherein the control circuit comprises a programmable device that is interfaced with the sensing circuit and the hold circuit, the programmable device being configured so as to cause the hold circuit to operate the line interface circuit in the operating mode in the event that the line-current does not exceed the predetermined magnitude, said operating mode being one of a linear mode or a non-linear mode.

12. A method for detecting the presence of an excessive line current supplied by a communications line and protecting a line interface circuit disposed within a communications device from the excessive line current, said method comprising the steps of:
   configuring the line interface circuit into one of a plurality of operating modes, wherein each of the operating modes provide a predefined voltage and current outline with respect to a voltage and a current presented to the line interface circuit;
   detecting the presence of an excessive line current received from the communications line;
   when said excessive line current is detected, substantially preventing at least a portion of the excessive line current from reaching the line interface circuit;
   when said excessive line current is not detected, configuring the line interface circuit into a predetermined operating mode, said predetermined operating mode including one of a linear mode or a nonlinear mode.

* * * * *